(12) United States Patent
Augier et al.

(10) Patent No.: US 11,638,404 B2
(45) Date of Patent: May 2, 2023

(54) HIGH-PRECISION POST DRIVER MACHINE

(71) Applicant: VITISAT, Orange (FR)

(72) Inventors: Olivier Augier, Orange (FR); Hervé Colin, Bollene (FR)

(73) Assignee: VITISAT, Orange (FR)

( * ) Notice: Subject to any disclaimer, the term of this patent is extended or adjusted under 35 U.S.C. 154(b) by 0 days.

(21) Appl. No.: 17/282,139

(22) PCT Filed: Sep. 30, 2019

(86) PCT No.: PCT/FR2019/052297
§ 371 (c)(1),
(2) Date: Apr. 1, 2021

(87) PCT Pub. No.: WO2020/070418
PCT Pub. Date: Apr. 9, 2020

(65) Prior Publication Data
US 2021/0352857 A1 Nov. 18, 2021

(30) Foreign Application Priority Data
Oct. 1, 2018 (FR) ..................................... 18 59071

(51) Int. Cl.
*A01G 17/16* (2006.01)
*B62D 55/08* (2006.01)
*E02D 7/14* (2006.01)

(52) U.S. Cl.
CPC ............. *A01G 17/16* (2013.01); *B62D 55/08* (2013.01); *E02D 7/14* (2013.01)

(58) Field of Classification Search
CPC .... E02D 7/08; E02D 7/06; E02D 7/14; E21B 15/00; A01G 17/16; B62D 55/08; E04H 17/263
(Continued)

(56) References Cited

U.S. PATENT DOCUMENTS 3,490,548 A * 1/1970 Lake .......................... E02D 7/16
173/28
3,548,604 A * 12/1970 Campbell .................. E02D 7/16
173/28
(Continued)

FOREIGN PATENT DOCUMENTS

FR 2554669 A * 5/1985 ............. A01C 11/00
FR 2584507 A1 1/1987
(Continued)

OTHER PUBLICATIONS

International Search Report and Written Opinion issued in PCT/FR2019/052297, dated Jan. 30, 2020, with English translation.

*Primary Examiner* — Gregory W Adams
(74) *Attorney, Agent, or Firm* — Hamre, Schumann, Mueller & Larson, P.C.

(57) ABSTRACT

Machine suitable for driving posts into the ground, in particular for a vineyard or orchard trellising structure, at predefined locations, with centimetric precision, the machine comprising: an electronic control unit, a GPS sensor, a driving column mounted on a vehicle chassis, via an articulated positioning adjustment system, the column comprising a pole and a slide mounted so as to be able to slide substantially vertically, a driving bell mounted on the slide, a post guiding device, which comprises a gripper mounted on the slide and a guide shoe mounted at the base of the pole, the guide shoe being able to move between a working position and a retracted position, the articulated positioning adjustment system allowing the driving bell and the guiding device to be positioned directly above one of the predefined locations and to drive the post in vertically there.

17 Claims, 11 Drawing Sheets

(58) Field of Classification Search
USPC .............................................. 173/28; 414/23
See application file for complete search history.

(56) References Cited

U.S. PATENT DOCUMENTS

| | | | | |
|---|---|---|---|---|
| 3,934,655 | A * | 1/1976 | Whistle | E04H 17/261 |
| | | | | 173/28 |
| 9,752,394 | B2 * | 9/2017 | Webb | E21B 19/161 |
| 2015/0176345 | A1 * | 6/2015 | Koskinen | E21B 17/16 |
| | | | | 175/57 |
| 2016/0138299 | A1 * | 5/2016 | Powers, III | E04H 17/263 |
| | | | | 173/184 |
| 2018/0127941 | A1 * | 5/2018 | Halonen | E02D 7/08 |

FOREIGN PATENT DOCUMENTS

| | | | | |
|---|---|---|---|---|
| FR | 2721047 | A1 * | 12/1995 | ............. A01G 17/16 |
| FR | 2897235 | A1 | 8/2007 | |
| FR | 2994631 | A1 * | 2/2014 | ............. A01G 17/06 |
| FR | 3051624 | A1 | 12/2017 | |
| WO | 0204769 | A1 | 1/2002 | |
| WO | WO-2012010119 | A2 * | 1/2012 | ............... E02D 7/10 |
| WO | WO-2012062241 | A1 * | 5/2012 | .......... E01F 15/0484 |

\* cited by examiner

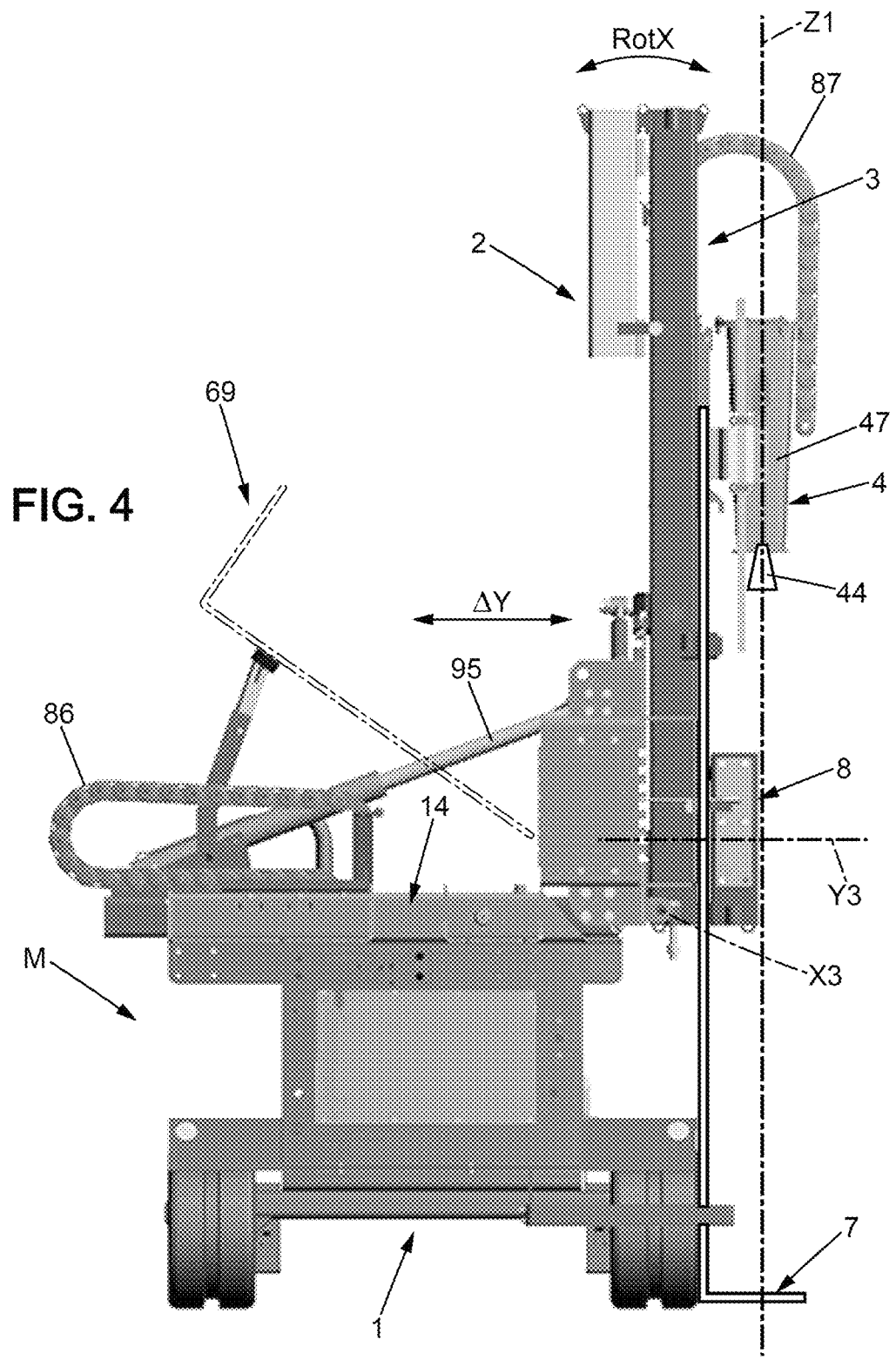

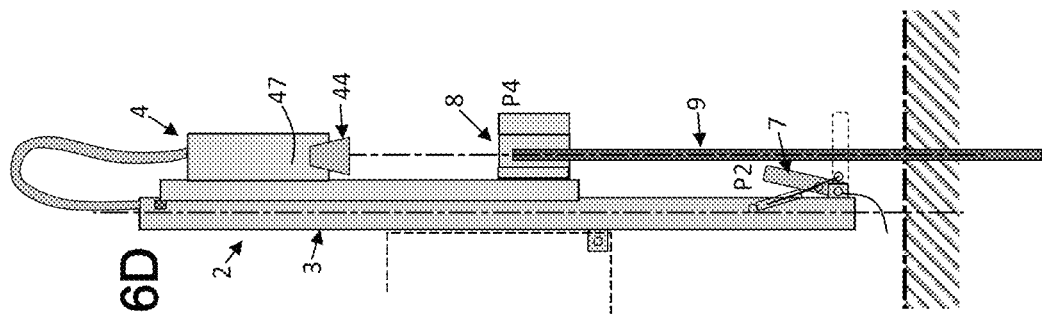
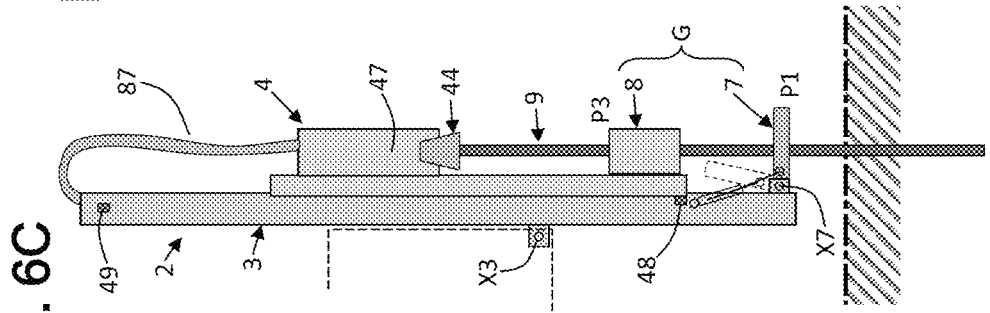
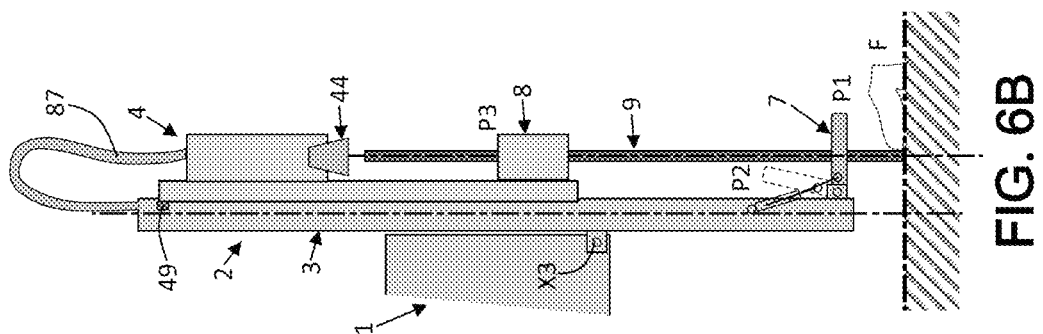
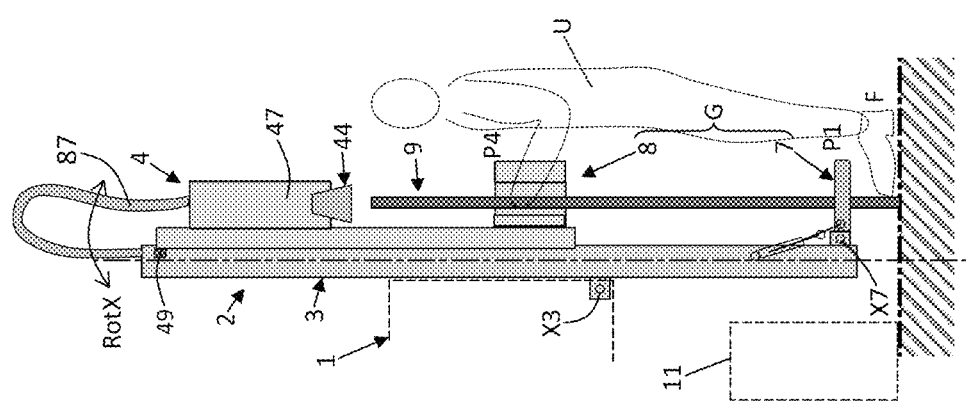

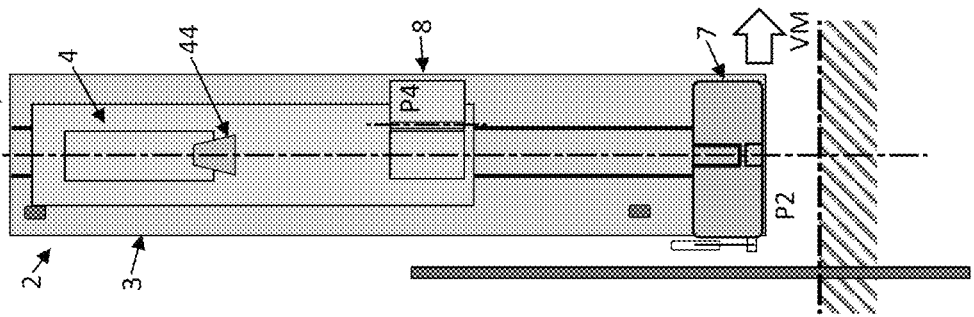
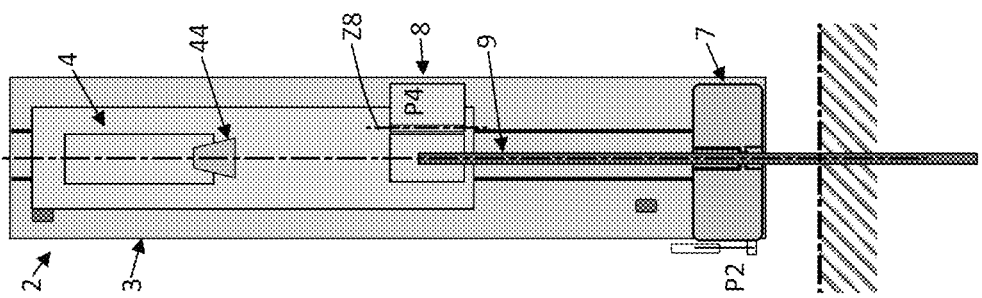
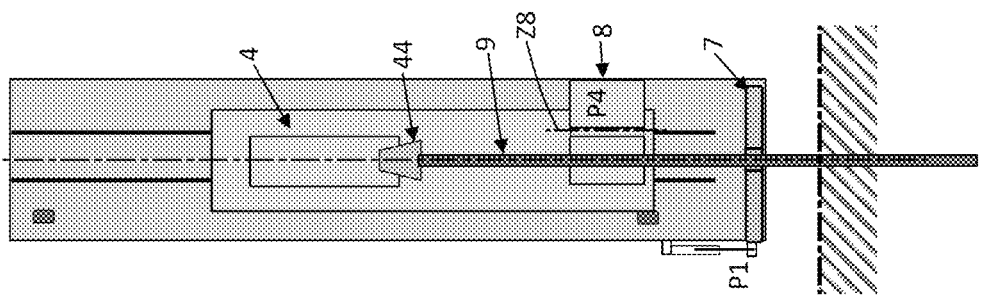
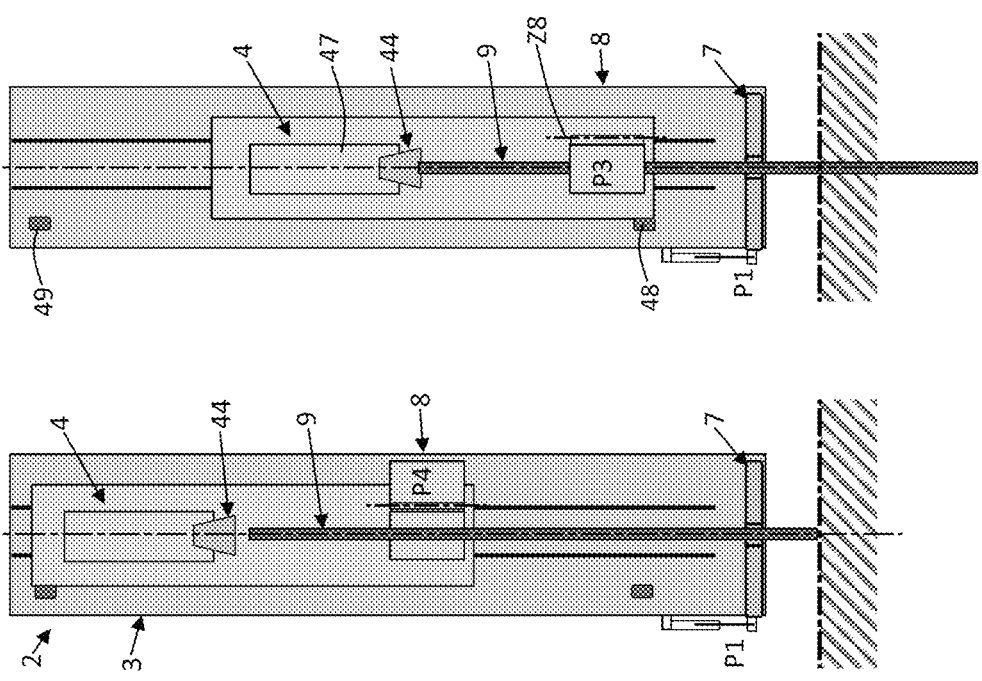

HIGH-PRECISION POST DRIVER MACHINE

FIELD AND CONTEXT OF THE INVENTION

The present invention concerns machines for driving in posts, those posts being intended to form a vineyard or orchard trellising structure. According to other possibilities, the posts in question may also be intended to form a market gardening greenhouse framework or a support structure for solar panels on a solar farm.

Known in the art are machines for driving in vertically posts also known as poles or stakes, such as for example that disclosed in the document FR2584507. It nevertheless remains very difficult to produce rows correctly in line and to compensate all and any irregularities of the terrain with this kind of machine.

A need has therefore become apparent to enhance the precision of the placing of the poles in order to facilitate subsequent work (maintenance, weeding, shredding of leaves, mechanized harvest) needed on vines and orchards and also to improve the geometric aesthetic appearance thereof. There has therefore become apparent a need to propose new solutions.

SUMMARY OF THE INVENTION

To this end there is proposed here a machine (M) suitable for driving posts (9) into the ground (in particular for a vineyard or orchard trellising structure) at predefined locations (P1-PN) [in particular along a row (L1) of plants already planted], with centimetric precision, the machine comprising:
- an electronic control unit (100),
- at least one GPS sensor (5),
- a driving column (2) mounted on a vehicle chassis (1), via an articulated positioning adjustment system (ΔX, ΔY, rotX, rotY),
- the driving column comprising a pole (3) and a slide (4) mounted so as to be able to slide substantially vertically on the pole,
- a driving bell (44) mounted on the slide,
- a post guiding device (G), which comprises a gripper (8) mounted on the slide and a guide shoe (7) mounted at the foot of the pole, the guide shoe being able to move between a working position (P1) and a retracted position (P2), the articulated positioning adjustment system allowing the driving bell and the guiding device to be positioned directly above one of the predefined locations and to drive the post in vertically there.

Subject to which, when the guide shoe is in the working position, it guides precisely the base of the post to be driven in on at least three sides in the horizontal plane and when the guide shoe is in the retracted position it enables the vehicle to move after driving in the post without interfering with the post that has just been driven in, or where applicable the plants already planted in the row.

Subject to which, the machine can be used to drive in posts precisely and with good verticality along a planting line of young vine stock or shrubs.

The articulated positioning adjustment system allows compensation of the camber of the terrain and the inaccuracy of movement of the vehicle chassis. A correction in translation and in rotation about X and about Y allows compensation of vehicle chassis positioning and orientation errors, for correct and precise positioning of the driving column relative to predefined locations on the predefined line.

Moreover, using accurate GPS, in particular differential or RTK GPS, allows definition and very precise tracking of the required mapping for the posts to be driven in, referred to as centimetric precision, because the position inaccuracy is of the order of a centimeter.

Moreover, thanks to the position of the GPS sensor substantially vertically above the location for driving in the posts, "both ways" driving in, that is to say driving with no "return empty", may be offered whilst scrupulously respecting the intended mapping.

In the case of the present invention, it should be noted that the predefined line L1 will in most cases be rectilinear (and thus a straight line), but the predefined line L1 may also feature a slight curvature, for example to follow a curved contour of the parcel of land. The system described also allows quincunx and off-square trellising and Bordeaux type enclosure.

In various embodiments of the invention recourse may further be had where appropriate to one and/or the other of the following features, separately or in combination.

In accordance with one advantageous configuration, when the guide shoe is in the working position (P1) it guides and forms an abutment for the bottom of the post to be driven in, preferably on three sides in the horizontal plane, and it therefore suffices for an operative to place the base of the post in the guide shoe to obtain simple and precise positioning. The foot F of the operative U pushes the post from the fourth side, and the position of the bottom of the post is therefore clearly defined, in a precise and positive manner.

In accordance with one aspect, the guide shoe may be rotatably mounted at the base of the pole with an axis (X7) substantially parallel to the longitudinal axis X1, the retracted position (P2) being raised relative to the working position (P1). This is a simple and reliable retraction solution, which allows space to be freed up for the machine then to move forward without interfering with the posts and young plants.

In accordance with one aspect, the guide shoe comprises a housing in the form of a notch (75) delimited on three sides (71,72,73) by tabs adjustable in position and the housing being open on the fourth side opposite the base of the pole. Subject to which the size of the housing may be adapted, thanks to the tabs, as a function of the section of the posts to be driven in; the positioning of the post by an operative is therefore easy and practical and the position of the bottom of the post is clearly defined, in a precise manner with no significant offset.

In accordance with one aspect, the gripper (8) comprises a base (81) fixed to the slide (4) and a mobile jaw (82), the jaw being mobile between a closed working position (P3) and an open position (P4). The gripper advantageously allows the high portion of the post that is to be driven in to be held when said gripper is closed. When it is open, the user can easily position a post correctly under the driving bell before giving a signal to allow or to provoke the closure of the gripper. Moreover, when the gripper is open, it allows the machine to move forward without interfering with the post that has just been driven in.

In accordance with one aspect, the mobile jaw is mounted to rotate relative to the base of the gripper about a vertical axis (Z8). This forms a simple, rugged and reliable solution for obtaining the two principal positions of the gripper.

In accordance with one aspect, there is provided in the gripper a play compensating system or a shim that is adjustable to assure positive positioning of the high portion of the post. Note that the gripper holds the post in position without necessarily exerting a strong clamping action because the gripper does not contribute directly to driving in the post.

In accordance with one aspect, there is further provided an upper element (52) equipped with two GPS sensors (5A,5B) receiving the signals from the GPS satellites and coupled to an adjoining stationary base (55) for receiving the GPS signals. Thus thanks to the stationary base the precise, in particular RTK, GPS geolocation mode may be used; moreover, using two sensors allows a line X8 to be defined corresponding to the longitudinal direction X1 of the machine that has to be aligned with the row of plants and the line L1 of the cartographic locations for driving in the posts.

In accordance with one advantageous option, the position barycenter of the two sensors is located vertically above the driving bell; this allows easy control of the adjustment of the position of the machine so that the position of the post vertically in line with the driving bell corresponds precisely to the required position in the mapping. This facilitates operation in the bothway mode, with no return empty.

In accordance with one aspect, the driving bell (44) is mounted on the slide (4) via a vibratory percussion system (47). Subject to which, it is possible to drive in posts of large section in hard terrain without difficulty.

In accordance with one aspect, the machine is advantageously a self-propelled vehicle, preferably provided with caterpillar tracks; this allows a lower pressure on the soil than tires and improved lift and grip in the case of wet terrain.

In accordance with one aspect, the machine may alternatively be equipped with wheels.

In accordance with one aspect, the machine may take the form of a straddle type vehicle capable of straddling a row of vines or of plants.

In accordance with one aspect, the machine is configured to move forward automatically between the predefined locations (P1-PN). This movement is fast and does not necessitate the intervention of a driver; this improves the efficiency of the site. Given the nature of the terrain, the precision of stopping at the end of this movement may not conform to the expected centimetric precision.

In accordance with a complementary aspect, after moving forward in automatic mode and stopping of the chassis of the vehicle, the machine uses the articulated adjustment system to position the post guide device and the driving bell precisely vertically above the required location, for the post to be driven in there.

In accordance with one aspect, the articulated driving column positioning adjustment system is formed by an articulation arrangement with three or four motorized degrees of freedom, namely translation along an axis termed the transverse axis Y optionally with translation along the longitudinal axis termed X and moreover rotation about the longitudinal axis X and rotation about the transverse axis Y (to compensate the local soil inclination).

In accordance with one aspect, the articulated system comprises an intermediate frame (14) mounted to move in translation along the transverse axis and optionally along the longitudinal axis, the driving column (2) being mounted to rotate about the transverse axis and to rotate about the longitudinal axis relative to said intermediate frame (14).

In accordance with one aspect there are provided end of travel switches (48,49) adjustable in position along the vertical travel of the slide.

In accordance with one aspect, an incremental encoder (58,59) is provided on each of the two motorized degrees of freedom in translation ($\Delta X, \Delta Y$).

In accordance with one aspect, there is provided an inclinometer (57) on each of the two motorized degrees of freedom in rotation (rotX,rotY) or a single inclinometer for the two degrees of freedom.

In accordance with one aspect, the machine may further comprise a magazine (69) for the posts to be driven in. The machine is therefore autonomous including in terms of supply.

In accordance with one aspect, the machine may further include a hydraulic motor and a hydraulic pump.

In accordance with one aspect, the machine may further comprise hydraulic motors, preferably one for each side of the vehicle when the latter is in the caterpillar-track configuration.

In accordance with one aspect, the machine further comprises at least one cycle validation pushbutton (25) in order to authorize the driving in cycle (after the post is put in place by the operative and the gripper closed).

In accordance with one aspect, the machine may further comprise at least one display screen (72) which may where appropriate be touch-sensitive.

DESCRIPTION OF THE FIGURES

Other features and advantages of the invention will become apparent in the course of the following description given by way of nonlimiting example with reference to the appended drawings, in which:

FIG. 4 represents an elevation view from behind of the machine from FIG. 3, FIGS. 5A 5B represent views in elevation of the machine from FIG. 3, respectively as seen from the lefthand side and as seen from the righthand side, FIGS. 6A to 6D illustrate different steps of driving in a post, as seen from the side, FIGS. 7A to 7E illustrate different steps of driving in a post, as seen from in front.

DETAILED DESCRIPTION OF THE INVENTION

In the various figures, the same references designate identical or similar elements.

Site and General Points

Figure 1:
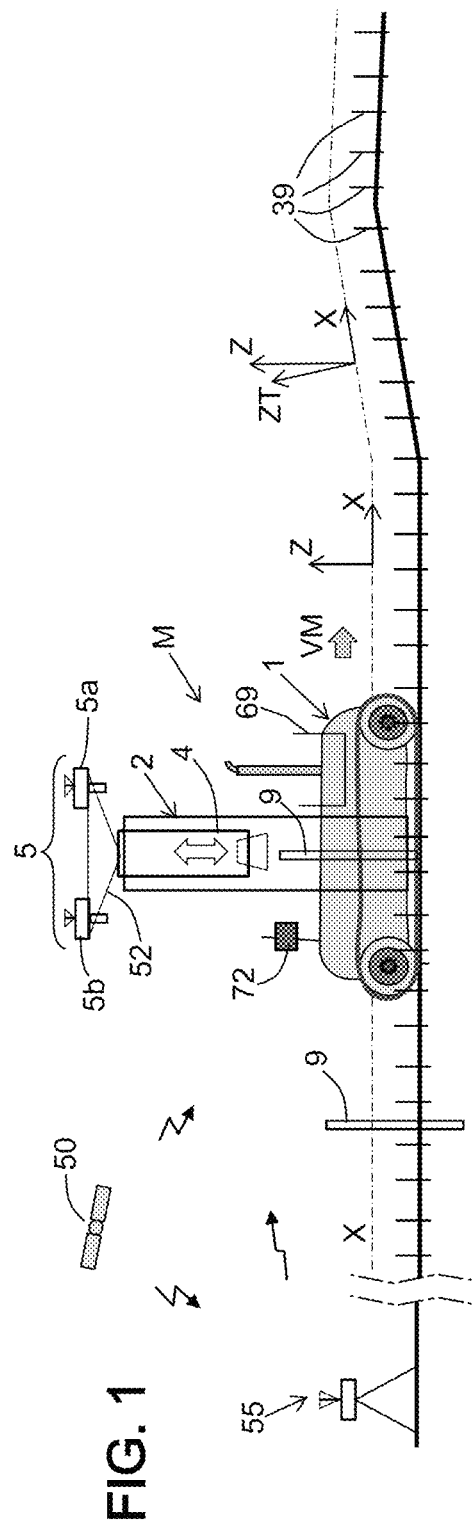
FIG. 1 represents a profile view of a site for driving in trellising posts for an orchard or a vineyard.

In FIG. 1, there has been represented a site for planting young vine stock or shrubs, either for a completely new orchard or vine or for complete renewal of the trellising of an existing vine or an existing orchard.

To this end, thanks to the machine M according to the present invention, posts 9 are going to be inserted along a line L1 where plants 39 have already been planted (young vine stock or young shrub). If necessary, a new vine stock 39 has been planted with an associated training stake that will serve as a support as the young vine plant grows. Note that there is a training stake associated with each plant while the aforementioned posts 9 are of larger size (1.5 m or more) and are more spaced, typically one every 5 m or even more.

Once the posts 9 will have been placed, trellising wires (not represented) will be tensioned and supported by said posts, as known in itself and therefore not described in detail here. The posts 9 ready for use are stored in a magazine or hopper 69 provided on my machine.

The posts 9 must be driven in precisely at predefined locations, the predefined locations being denoted P1,P2, Pi . . . .

Figure 2:
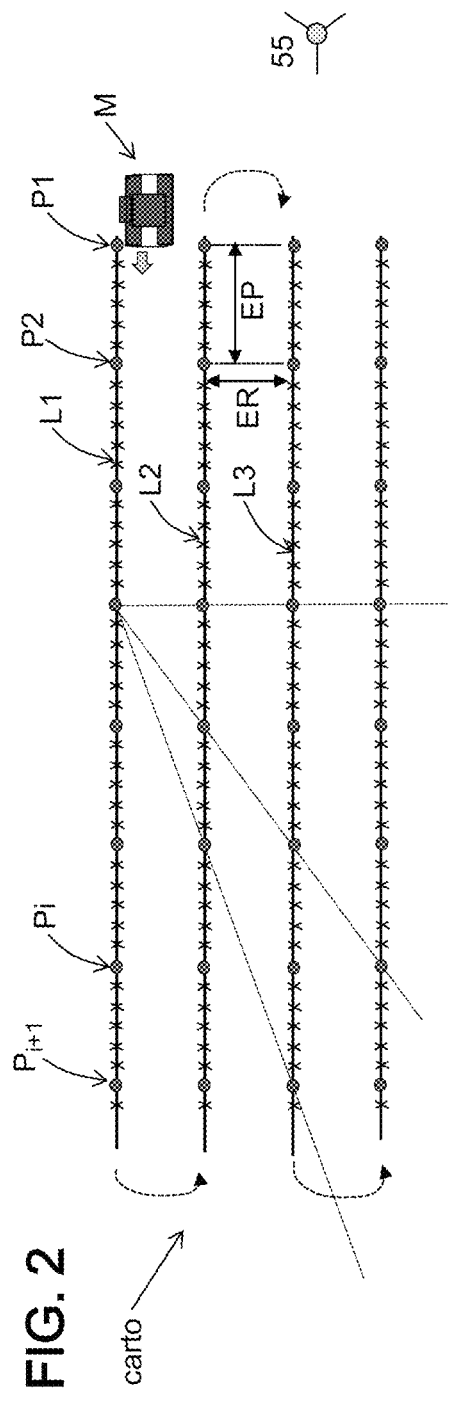
FIG. 2 represents a view from above of the required mapping of the trellising posts.
Figure 3:
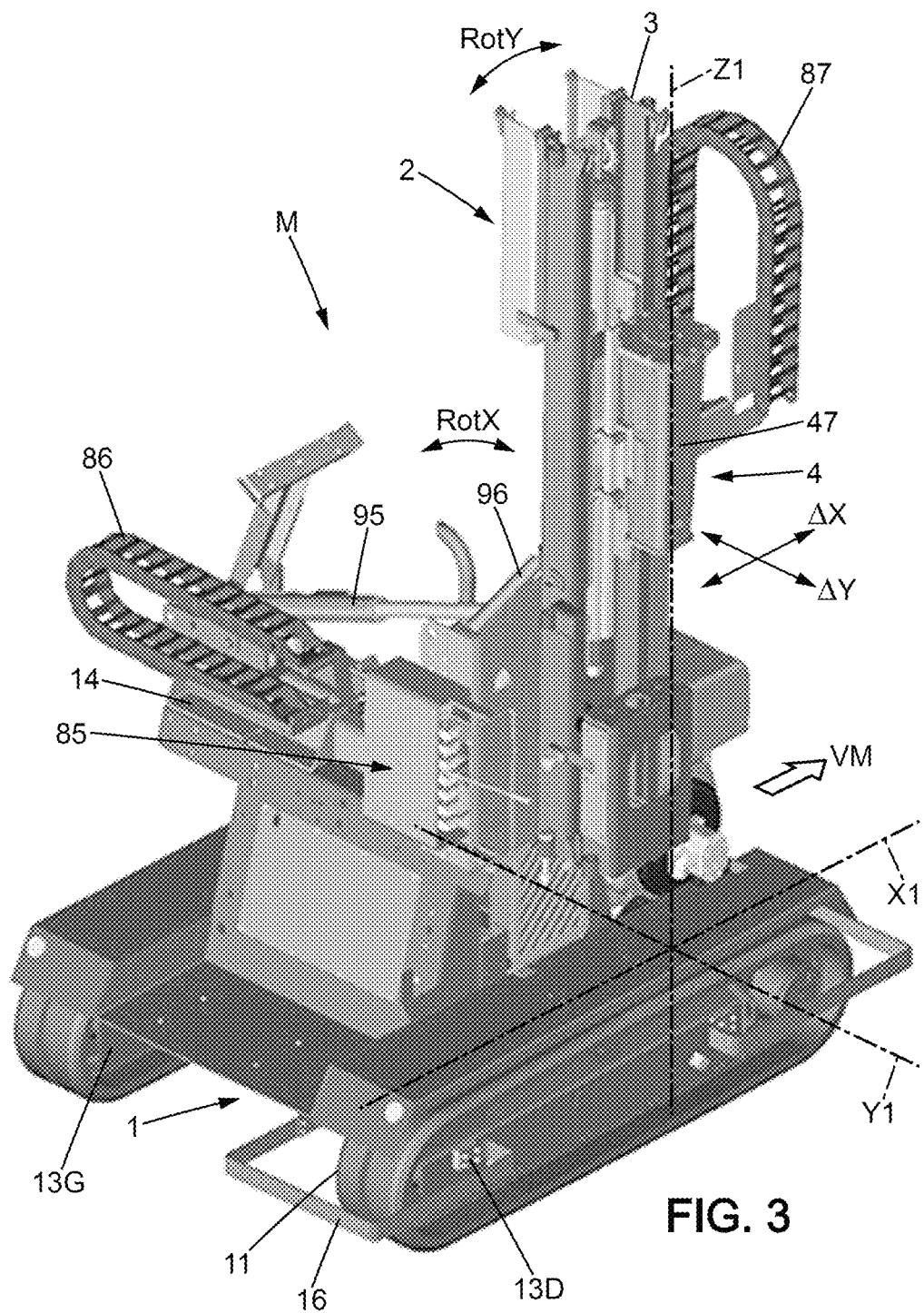
FIG. 3 represents a perspective view of the machine in accordance with the invention.
Figure 5A:
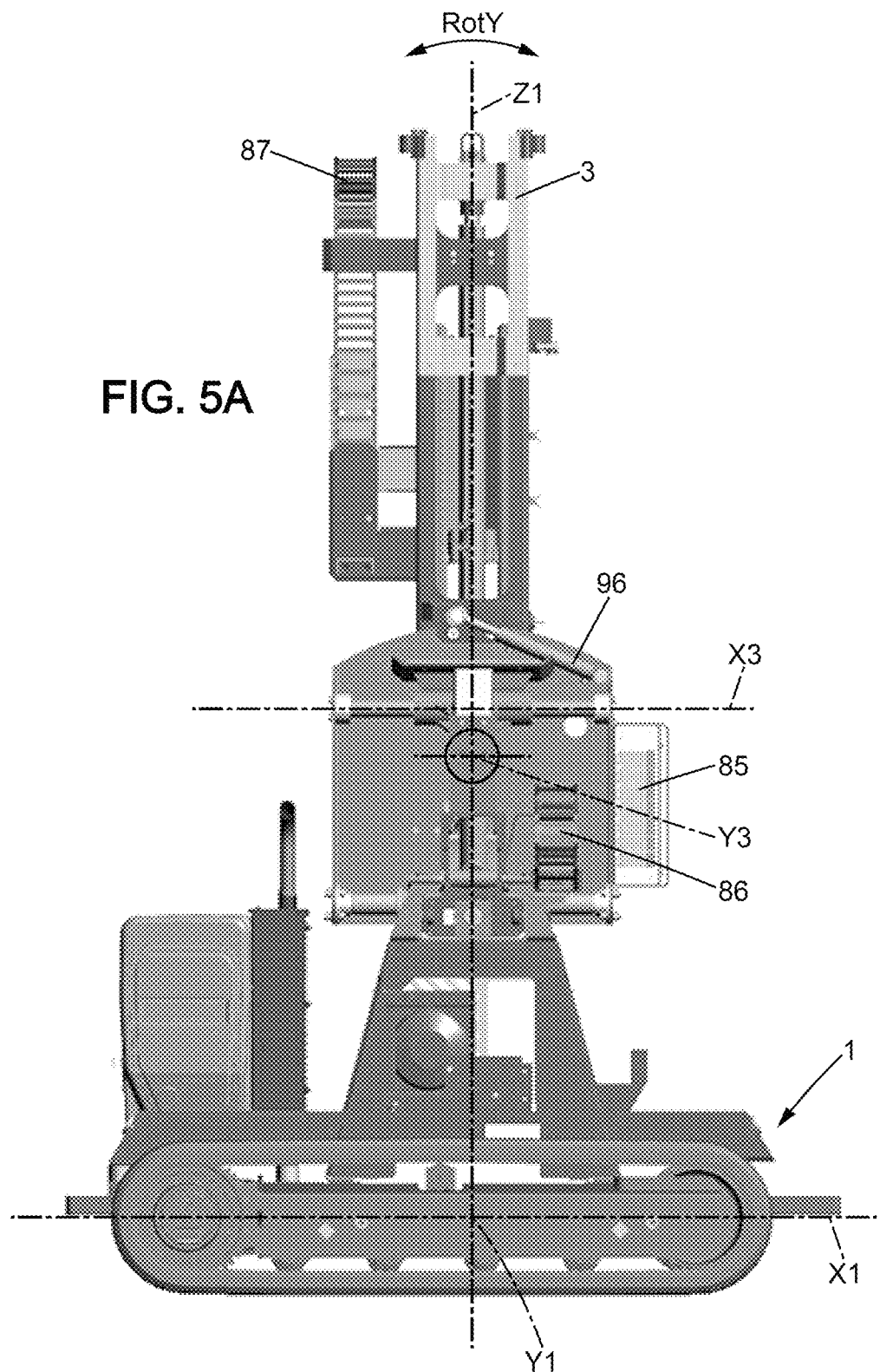
Figure 5B:
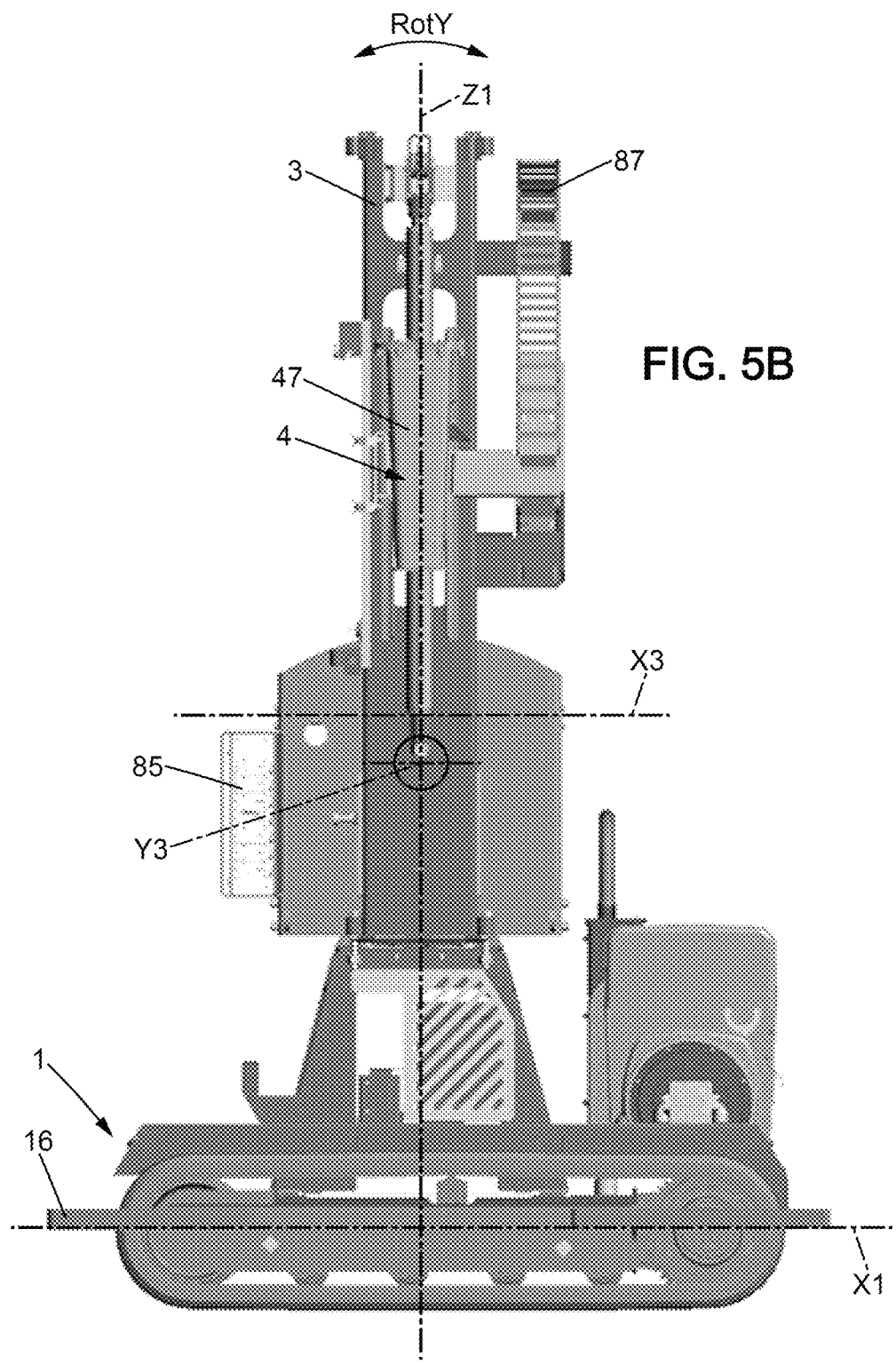

As illustrated in FIG. 2, the predefined locations (P1, P2, . . . ) where a post 9 is going to be driven in are defined by a precise mapping; the aim is that the driving in and trellising thereof conform to this target to the nearest centimeter, whence the designation "centimetric precision driving".

Moreover, as already mentioned, it is important to insert the posts 9 properly vertical, compensating the various possible cambers of the terrain.

In the figures the axes and directions are named as follows:

X is the direction of forward movement corresponding to the longitudinal direction, X1 is the longitudinal direction of the machine, Y1 is the transverse direction corresponding to the axis of the driving wheels of the machine, perpendicular to X1, YT is the transverse direction corresponding to the local horizontal, that is to stay the perpendicular to X corrected for the local camber/inclination, Z is the vertical direction, W1 is the direction of elevation of the machine, perpendicular to X1 and Y1, ZT is the direction of elevation of the machine compensated for the camber of the terrain, that is to say compensated in roll, but not necessarily in pitch.

The direction X of forward movement is locally close to a predefined line L1 on which are positioned the predefined locations (P1,P2,Pi,$Pi_{+1}$ . . . ) at which the posts 9 will be driven in.

As illustrated in FIG. 2, the vineyard (or young orchard) usually comprises rows of vines parallel to one another (at least locally) and spaced by a distance ER that in practice is often between 2 m and 2 m 50 inclusive, which enables an agricultural tractor to pass between the rows for subsequent work. However, there is nothing to rule out the distance ER being less than 2 m, for example 1 m in some viticultural regions.

Each row consists of a succession of points P1,P2,Pi,$Pi_{+1}$ for driving in the posts 9 that are spaced along the direction of the row by a predefined distance denoted EP that in practice is around 5 meters, often included in a range [4 m, 6 m].

For a given row, the predefined line L1 is very often rectilinear, but there exist situations in which the predefined line L1 has a curvature and is therefore not rectilinear. A predefined line L1,L2,L3, etc. is defined for each of the rows.

For a parcel of vines a unique and homogeneous distance EP is usually maintained, except in the borders of the parcel (see below). Likewise, the distance ER between rows may typically be chosen once and for all in a given parcel.

Machine

The machine M described here is of the self-propelled type (or 'self-propelled machine', 'self-propelled vehicle'), that is to say does not need to be towed by another machine. Moreover, the machine in question has a high degree of autonomy (see below), only a few operations being intended to be carried out by a human operative denoted U.

The machine M is configured to drive posts into the ground when stationary, that is to say at that moment it is not moving forward. After actual driving in of a post at the point Pi, the machine effects operations in automatic mode to move into a position in the vicinity of the next predefined location, i.e. $Pi_{+1}$.

The movement of the machine from the point $P_i$ to the point $P_{i+1}$ may be relatively rapid with a cruising speed above 15 km/h of the order of 20 km/h. Regarding the speed profile of this movement, an acceleration ramp and a deceleration and stopping ramp may be provided.

The precision required for positioning the posts is not obtained by the precision with which the self-propelled machine is stopped but thanks to an articulated adjustment system that will be described hereinafter.

The speed of forward movement of the machine is denoted VM.

VM=0 during the sequence of pre-positioning the post and driving in the post. In accordance with a variant, a (forward and/or reverse) movement in X at very low speed may be used to adjust the position along X (this replaces the degree of freedom ΔX referred to hereinafter).

A precision, in particular RTK type, GPS geolocation system is used. In practice, an onboard GPS receiver 5 is installed on the mobile machine and a reference receiver 55 is installed on a base fixed to the ground, and each of these receives the GPS signals from the satellites 50. The reference receiver 55 transmits the signals received to the machine that is moving, which allows correction of errors caused by transmission, which allows a precision to the nearest centimeter to be obtained.

The differential GPS and/or RTK real time GPS systems known in themselves will not be described in more detail here.

In the example illustrated here, two GPS receivers denoted 5a and 5b are used. The two sensors may be mounted on a support 52.

In the example illustrated the machine M is tasked with carrying out the operations of placing and driving in the posts with the assistance of an operative U. The role of the operative is to take a post from the magazine 69 of posts 9 and to place it in the gripper and in the guide shoe and then to validate by pressing the cycle start pushbutton 25.

In accordance with the invention, the machine M comprises a chassis 1 that may also be referred to as a 'traction base' or 'vehicle base'. The machine M is a quasi-autonomous vehicle.

In the example illustrated the chassis of the machine comprises caterpillar tracks 11 that serve to support the machine and to move it forward, by means of hydraulic motors (respectively 13D and 13D). Safety bumpers 16 are provided around the caterpillar tracks, in particular on the side where the post driving operation unfolds. An emergency stop function may be provided for use in the event of substantial contact with safety bumpers.

One of the essential elements of the machine is the driving column 2. The driving column 2 is mounted on the chassis by means of an articulated position adjusting system.

In the example illustrated, a kinematic chain with three or four motorized degrees of freedom is provided between the chassis 1 and the driving column 2. In particular, a frame termed the intermediate support 14 is provided and mounted on the chassis with one or two degrees of freedom, namely in translation along the transverse axis Y and where necessary in translation along a longitudinal axis X.

The driving column 2 is mounted on the intermediate support 14 with two degrees of freedom, namely rotation about the longitudinal axis X with axis X3 and rotation about the transverse axis Y with axis Y3.

All of the controlled movements between the chassis 1 and the driving column 2 form an articulated positioning adjustment system with three or four degrees of freedom.

Each of the controlled movements is driven by a double-acting hydraulic cylinder, as will emerge in more detail hereinafter.

The driving column 2 comprises a pole 3 and a slide 4 with a driving bell 44. The pole 3 extends substantially in the direction Z1 in particular when the adjustment rotY and the adjustment rotY are in a neutral position.

The slide 4 is mounted to slide on the pole 3 by means of a slide system 34.

Figure 11:
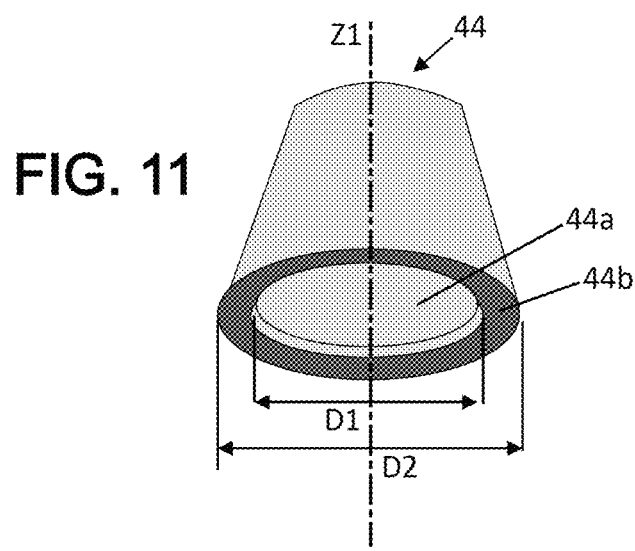
FIG. 11 represents the driving bell in more detail.

The driving bell 44 is mounted on the slide, optionally with a percussion system 47 between them. The percussion/vibratory system 47 is known in itself and will therefore not be described in detail here. The driving bell 44 is illustrated in FIG. 11. It has a flat lower face 44a with a projecting border 44b. Thanks to the flat face, in conjunction with good verticality of the post, even with the percussion system 47, the bearing engagement produced is flat and therefore the summit of the post is not damaged, thus avoiding recourse to a wear part, that is to say a disposable part.

Guiding the Post

A device G for guiding the post 9 is provided that comprises a gripper 8 for guiding the higher or medium portion of the post and a guide shoe 7 for guiding the bottom of the post.

The guide shoe 7 is mounted at the base of the post 3. In this instance it is mounted to be mobile between a working position P1 and a retracted (or withdrawn) position P2.

When the guide shoe 7 is in the working position P1 it forms a guide for the bottom of the post to be driven in on three sides in the horizontal plane. When the guide shoe 7 is in the retracted position P2 it allows the machine M to move forward without interfering with the post 9 that has just been driven in or the plants 39 already present in the row.

In accordance with the solution illustrated, the guide shoe is mounted to rotate at the base of the pole with an axis X7 substantially parallel to the longitudinal axis X1, the retracted position P2 being raised relative to the working position P1. It must nevertheless be pointed out that other kinematic chains are possible.

Figure 10:
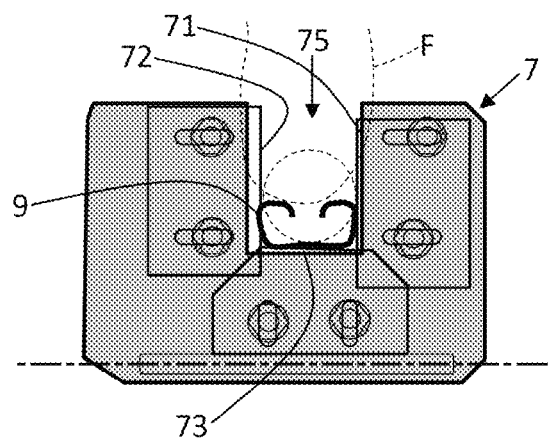
FIG. 10 represents the guide shoe in more detail.

In accordance with the solution illustrated, the guide shoe is formed as a thick plate with an axis tube. Moreover, the guide shoe comprises a housing 75 in the form of a notch delimited on three sides by tabs (71,72,73) that are adjustable in position. Each tab may be adjusted in position by means of openings and nuts, as illustrated in FIG. 10.

The housing being open on the fourth side opposite the base of the pole it is the foot F of the operative that pushes the post against the opposite tab 73.

Note that the tab labelled 73 is located under the thick plate while the shims or tabs 71,72 are located above the thick plate.

Figure 9:
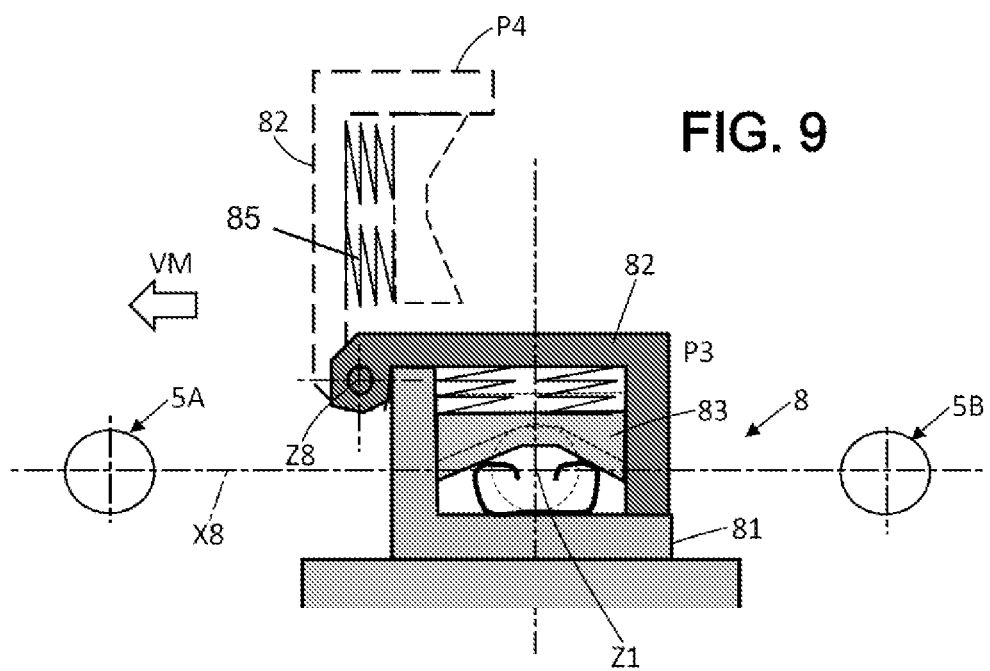
FIG. 9 represents the gripper in more detail.

The gripper 8 is fixed to the slide 4. As illustrated in FIG. 9 the gripper 8 comprises a base 81 fixed to the slide 4 and a mobile jaw 82.

The mobile jaw 82 is mobile between a closed working position P3 and an open position P4. Retention in the horizontal position is sufficient because it is the driving bell that produces the vertical force.

The mobile jaw is mounted to rotate relative to the base of the gripper about a vertical axis Z8. A play compensation system (V-shaped part 83 pushed by a spring 85) or an adjustable shim is optionally provided to assure positive positioning of the high portion of the post.

Moreover, when the gripper is opened, it allows the machine to move forward without interfering with the post that has just been driven in (cf. FIG. 9).

Figure 8:
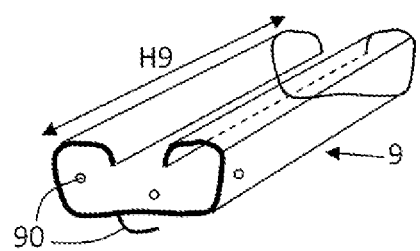
FIG. 8 illustrates a post to be driven in, formed as a metal profile.

The gripper 8 and the guide shoe 7 allow positioning of different types of post. A single type of post is generally used on a given site, but from one site to another posts may be used of metal profile type (cf. FIG. 8), of wooden post type, of plastic polymer post type with good mechanical properties. In the example illustrated, there has been represented a metal profile of length H9 between 2 m and 2.6 m inclusive in practice with holes and attachments 90 for supporting and retaining the trellising wires.

Method and Control

As illustrated in FIGS. 6A and 7A (step S4 in FIG. 13), the machine having finished the precise positioning, the gripper 8 is opened and the guide shoe 7 is lowered into the working position P1. The operative U can then place a post 9 taken from the magazine against the base 81 of the gripper and in the notch 75 of the shoe.

When this positioning is correct, the operative U presses on a control member to close the gripper; as illustrated in FIG. 6B (step S5 in FIG. 13), the machine therefore commands the closing of the mobile jaw 82 of the gripper (step S6 in FIG. 13) by the cylinder 98.

When the gripper is closed, the operative U presses the validation button 25 (step S6 in FIG. 13) to start the cycle of automatic driving in of the post.

After this, as illustrated in FIGS. 6C and 7B (step S7 in FIG. 13), the machine commands the driving in of the post by descent of the slide 4, the bell 44 with the percussion system driving the post into the ground. An end of travel switch (or detector) 48 that is adjustable in position allows the machine to stop the movement as soon as the required driving in distance is reached.

After this, as illustrated in FIG. 7C (step S8 in FIG. 13) the machine commands opening of the jaw 81 of the gripper by the cylinder 98 and raising (retraction) of the guide shoe 7 by the cylinder 97.

After this the machine commands the raising of the slide 4 (FIGS. 6D and 7D). An end of travel switch (or detector) 49 adjustable in position allows the machine to stop the raising movement at a sufficient height to insert an upright post, that is to say slightly greater than the height H9 under the bell 44.

Figure 13:
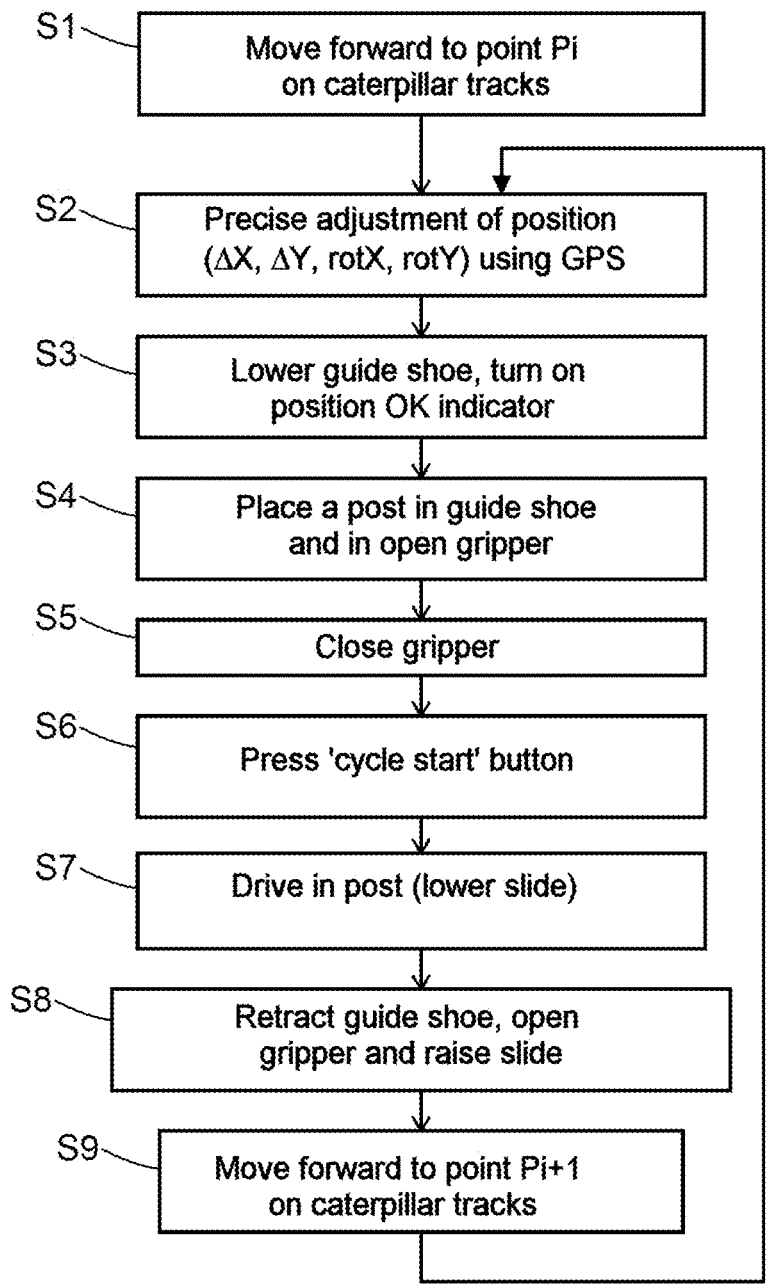
FIG. 13 illustrates an example of the sequence of operations carried out using the machine.
Figure 14:
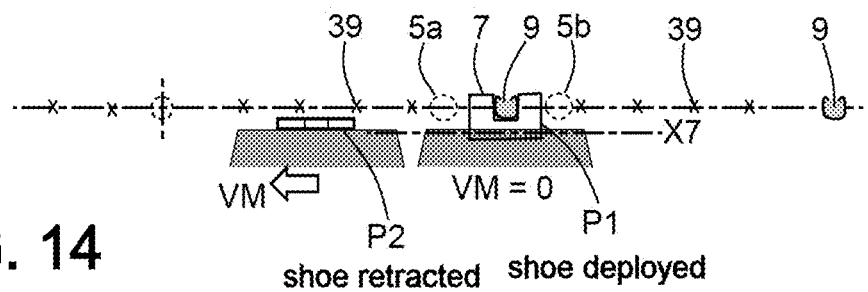
FIG. 14 shows the retraction and the withdrawal of the shoe for the machine to move forward.

At this moment, the mobile jaw 82 of the gripper being in front of the post and the shoe being raised, there is nothing to oppose the machine moving forward, and it may then move forwards along X without interfering with the post 9 that has just been driven in or the plants already present in the row L1 (steps S1 and S9 in FIG. 13). Here the machine commands the hydraulic motors 13G,13D of the caterpillar tracks to go to the next mapping point (FIG. 7E).

To be more precise, the machine is controlled so as to aim to cause the barycenter of the two GPS sensors (by clever design located at the same position as the axis of the driving bell) to coincide with the target point Pi+1. In the forward movement and automatic movement mode the machine aligns the direction X8 obtained from the sensors (corresponding to the longitudinal direction X1 of the machine) with the target trajectory (X with possible correction).

After stopping the forward movement of the chassis 1 the machine then uses the articulated system for adjusting the positioning of the driving column to position the latter in a precise vertical position and moreover in vertical alignment with the location Pi+1. To this end, the corrections in ΔX, ΔY, rotX, rotY are applied by commanding the hydraulic cylinders 93,94,95,96 (step S2 in FIG. 13).

Following this, as illustrated in FIG. 6A, the machine commands lowering of the guide shoe 7 by the cylinder 97.

And so on as far as the end of the row.

The half-turn at the row end may be effected in manual mode or in autonomous automatic mode.

Figure 12:
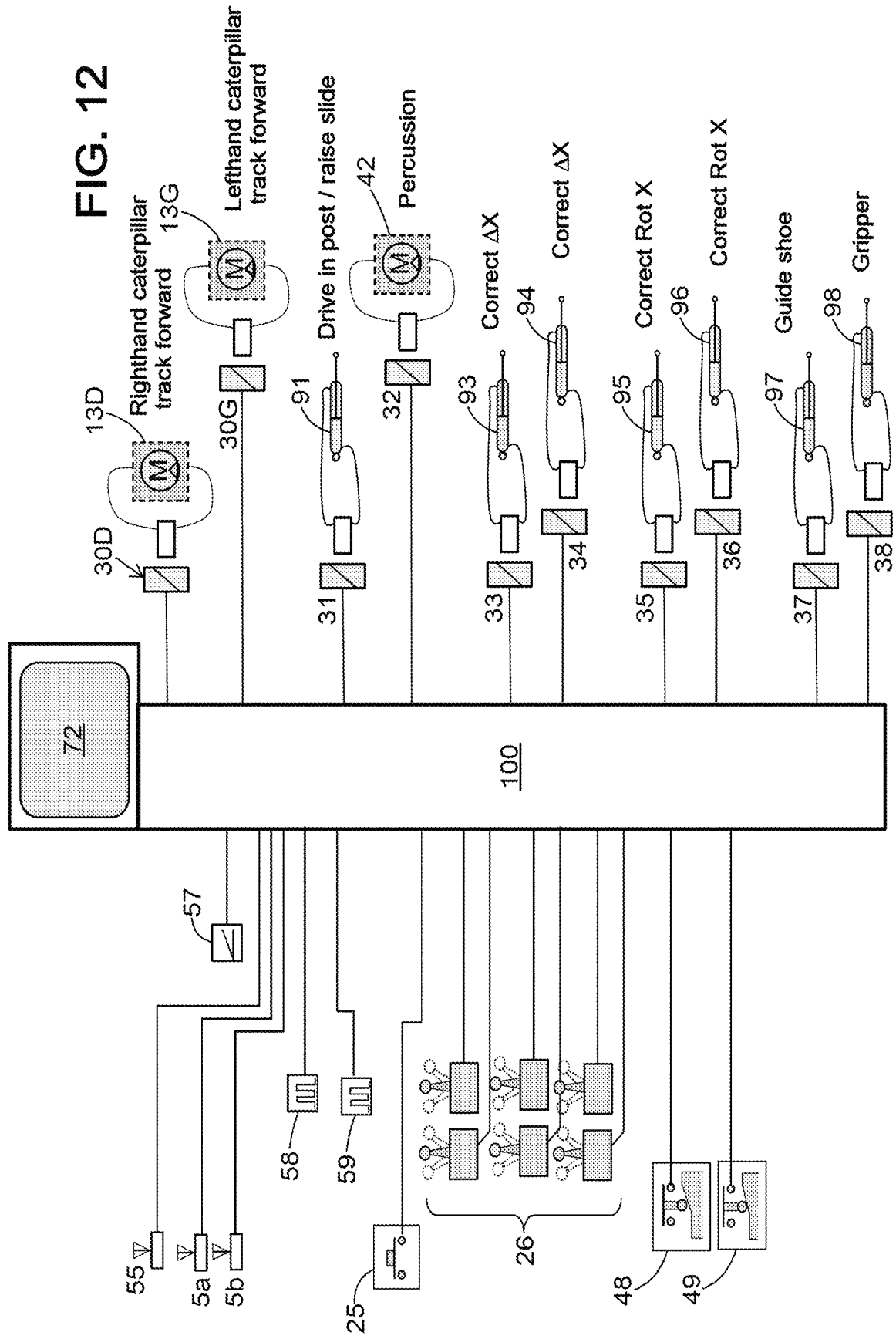
FIG. 12 illustrates a functional control diagram of the system that controls the machine.

As illustrated in particular in FIG. 12, the machine comprises a control computer 100 configured to control the electro-hydraulic distributors 30D,30G,31,32,33,34,35,36, 37,38 that are coupled to the respective hydraulic cylinders or hydraulic motors driving the following movements:
- 13D: righthand caterpillar track forward/reverse
- 13G: lefthand caterpillar track forward/reverse
- 91: raise slide (descent may be driven or merely by gravity during percussion),
- 42: post percussion,
- 93: correction ΔX,
- 94: correction ΔY,
- 95: correction rotX,
- 96: correction rotY,
- 97: raise/lower guide shoe 7,
- 98: open/close gripper 8.

The source of hydraulic pressure is a hydraulic pump installed on the machine and driven by a thermal engine of small cubic capacity; hydraulic motors are also provided, one for each side 13D,13G of the vehicle if the latter is in the caterpillar track configuration.

The control computer 100 controls a display screen 72.

In the example illustrated the control computer 100 and the display screen 72 are separate; they could however form one and the same unit.

It is therefore clear that the control computer 100 controls the movements of forward movement, of position correction (ΔX, ΔY,rotX, rotY), of gripper and guide shoe maneuvering, as well as the descent of the slide. This is done recurrently, for each post to be driven in, in accordance with the planting mapping provided.

Manual controls 26 are provided for each of the degrees of freedom, arranged in a control cabinet 85.

As illustrated in FIG. 12, the control computer triggers lowering of the slide 4 by a cylinder 91.

An incremental encoder 58,59 is provided on each of the two linear degrees of freedom (translation ΔX,ΔY). An inclinometer 57 is provided on each of the two motorized rotational degrees of freedom (rotX,rotY). A single two-axis inclinometer may be provided for managing the two degrees of freedom (rotX,rotY).

Note that the machine is equipped with telescopic pipes and cable supports, in this instance of the deployable chain type.

There are represented in the figures in particular the two cable supports, a first one 86 associated with the correction ΔY (amplitude up to 50 cm) and a second one 87 associated with lowering the slide 4 (travel adjustable between 60 cm and 1 m for driving in with a possible total travel up to 2.5 m or even 3 meters for adapting to any type of post).

It must be noted that a post is driven in without first producing a starter hole.

It must be noted that instead of caterpillar tracks the self-propelled machine may be equipped with wheels. In one configuration it may take the form of a straddling type machine.

The invention claimed is:

1. A machine suitable for driving posts into a ground at predefined locations with centimetric precision, for a vineyard or orchard trellising structure, the machine comprising:
    a vehicle chassis
    an electronic control unit,
    at least one GPS sensor,
    a driving column mounted on the vehicle chassis, via an articulated positioning adjustment system,
    the driving column comprising a pole and a slide mounted so as to be able to slide with regard to the pole, in a substantially vertical manner,
    a driving bell mounted on the slide,
    a post guiding device, which comprises a gripper mounted on the slide and a guide shoe mounted at a base of the pole,
    the guide shoe being able to move between a working position and a retracted position, the articulated positioning adjustment system allowing the driving bell and the post guiding device to be positioned directly above one of the predefined locations and to drive a post in vertically at the one of the predefined locations,
    wherein the guide shoe comprises a recess for receiving the post when the guide shoe is in the working position thereby guiding the post during insertion into the ground, and
    wherein the guide shoe is rotatably mounted with an axis substantially parallel to a longitudinal axis of the vehicle chassis, wherein the axis is located at a distal end of the pole and the retracted position being raised relative to the working position.

2. The machine as claimed in claim 1, such that when the guide shoe is in the working position it forms a guide for a bottom of the post to be driven in on three sides in a horizontal plane.

3. The machine as claimed in claim 1, wherein the recess of the guide shoe comprises a housing in the form of a notch delimited on three sides by tabs adjustable in position and the housing being open on a fourth side opposite the base of the pole.

4. The machine as claimed in claim 1, in which the gripper comprises a base fixed to the slide and a mobile jaw, the mobile jaw being mobile between a closed working position and an open position.

5. The machine as claimed in claim 4, in which the mobile jaw is mounted to rotate relative to the base of the gripper about a vertical axis.

6. The machine as claimed in claim 1, in which there is further provided an upper element equipped with two GPS sensors receiving GPS signals from GPS satellites and coupled to an adjoining stationary base for receiving the GPS signals.

7. The machine as claimed in claim 1, in which the driving bell is mounted on the slide via a vibratory percussion system.

8. The machine as claimed in claim 1, in the form of a self-propelled caterpillar-track vehicle.

9. The machine as claimed in claim 1, in which the machine is configured to move forward automatically between the predefined locations.

10. The machine as claimed in claim 4, in which there is provided on the gripper a play compensating system that is adjustable to assure positive positioning of a higher portion of the post.

11. The machine as claimed in claim 1, formed as a straddle type vehicle capable of straddling a row of vines or of plants.

12. The machine as claimed in claim 6, wherein a position of a barycenter of the two sensors is located vertically above the driving bell.

13. The machine as claimed in claim 1, wherein the articulated positioning adjustment system comprises three or four motorized degrees of freedom, comprising a translation along a transverse axis, a rotation about a longitudinal axis and a rotation about the transverse axis.

14. The machine as claimed in claim 1, wherein there are provided end of travel switches adjustable in position along a vertical travel of the slide.

15. The machine as claimed in claim 1, further comprising a magazine for containing the posts to be driven in.

16. The machine as claimed in claim 8, wherein the caterpillar-track vehicle comprises a couple of caterpillar tracks, wherein the post guiding device is arranged laterally outwardly with regard to the couple of caterpillar tracks.

17. The machine as claimed in claim 1, wherein the guide shoe, in the retracted position, is parallel to the pole.

* * * * *